July 3, 1923.
J. A. VIERLING
COMBINED INFANT CRIB AND GOCART
Filed May 25, 1922     4 Sheets-Sheet 1
1,460,929
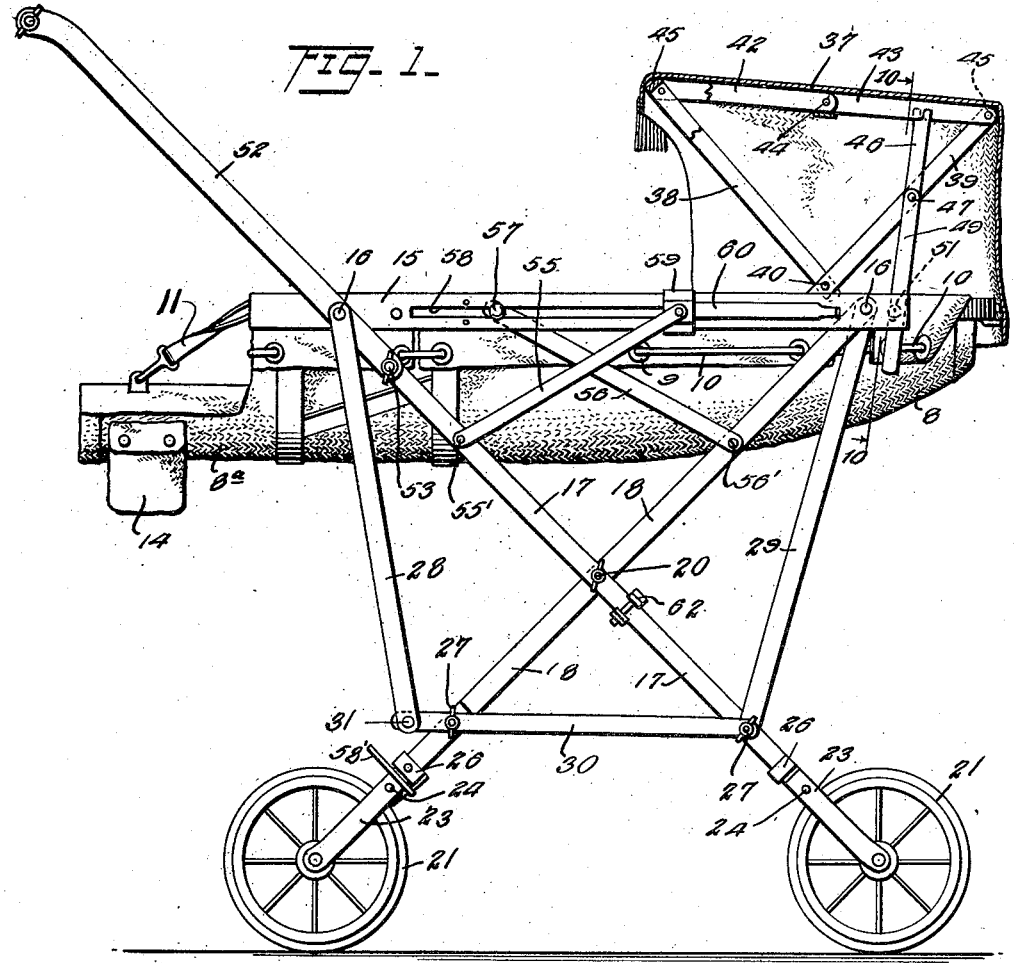
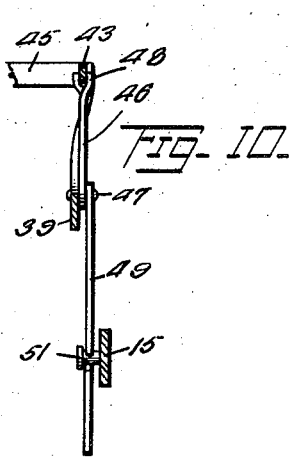
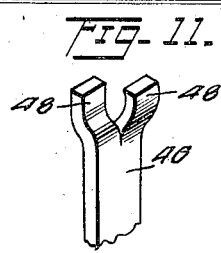
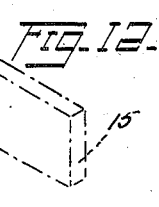
Inventor
J. A. Vierling
By J. K. Bryant
Attorney July 3, 1923.
J. A. VIERLING
1,460,929
COMBINED INFANT CRIB AND GOCART
Filed May 25, 1922
4 Sheets-Sheet 2
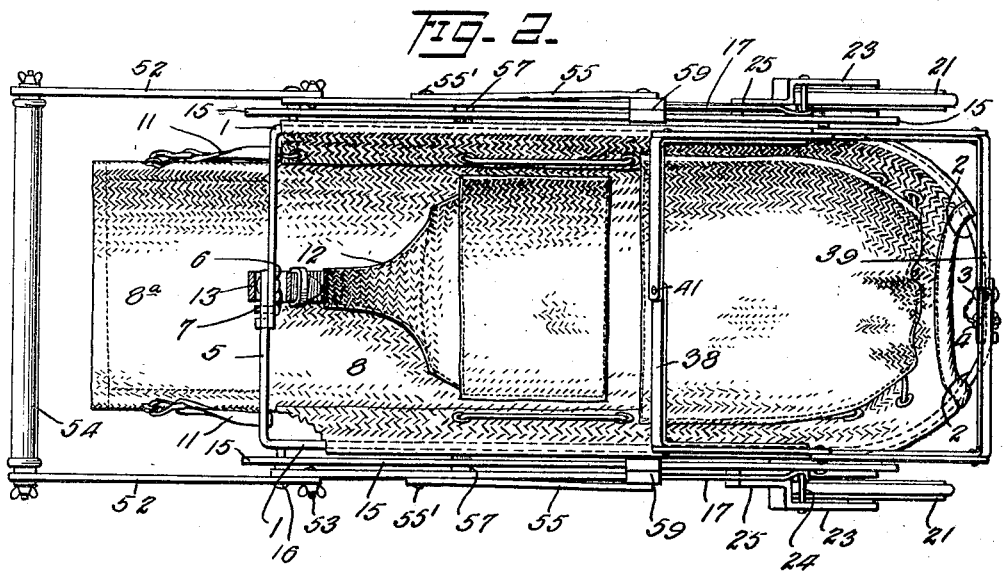
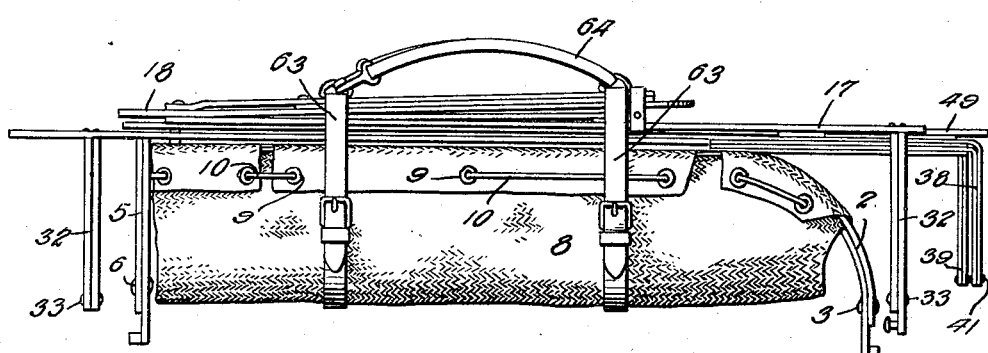
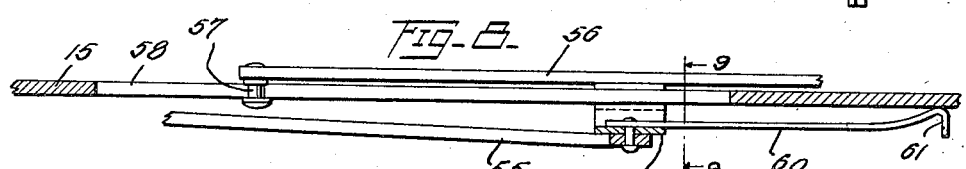
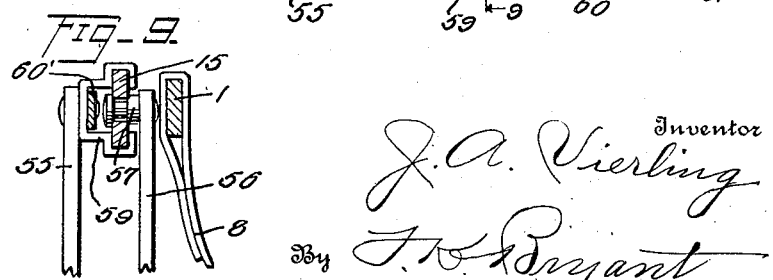

July 3, 1923.
J. A. VIERLING
COMBINED INFANT CRIB AND GOCART
Filed May 25, 1922      4 Sheets-Sheet 3
1,460,929
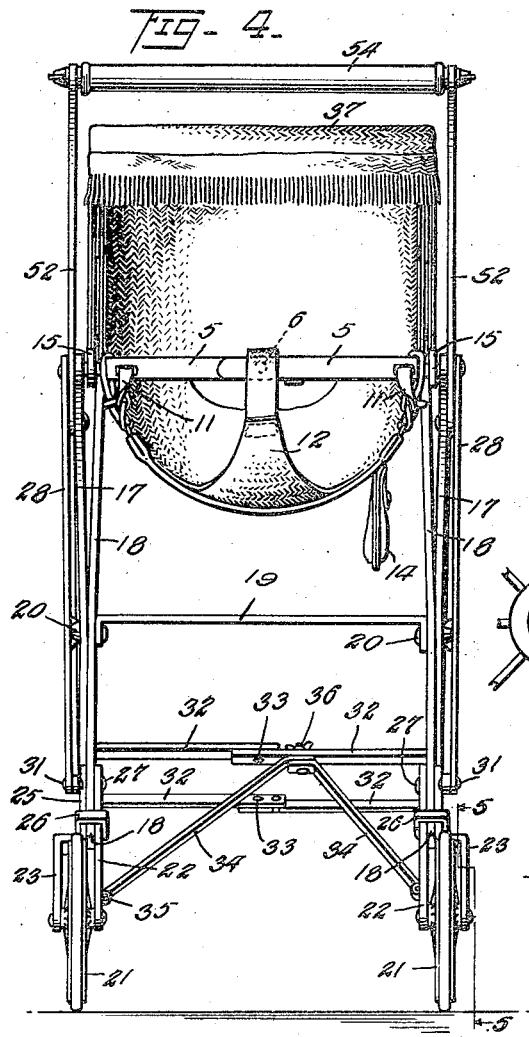
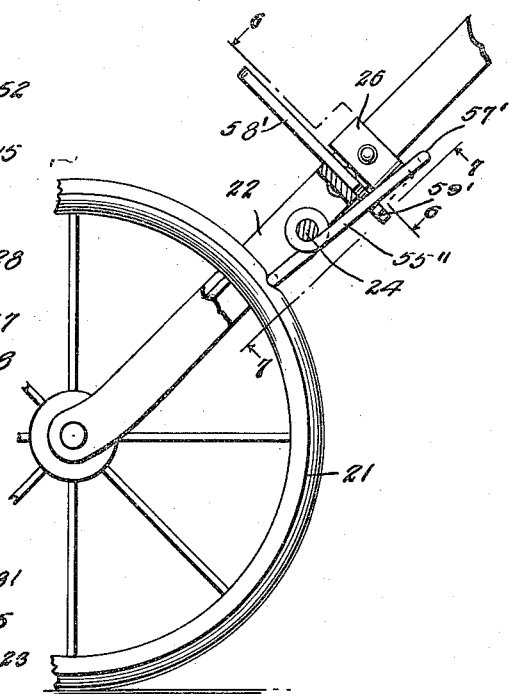
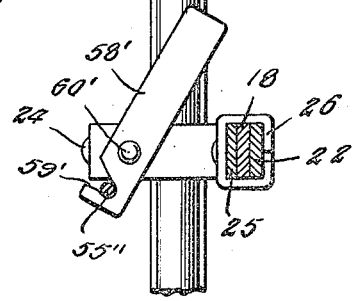

July 3, 1923.
J. A. VIERLING
1,460,929
COMBINED INFANT CRIB AND GOCART
Filed May 25, 1922     4 Sheets-Sheet 4
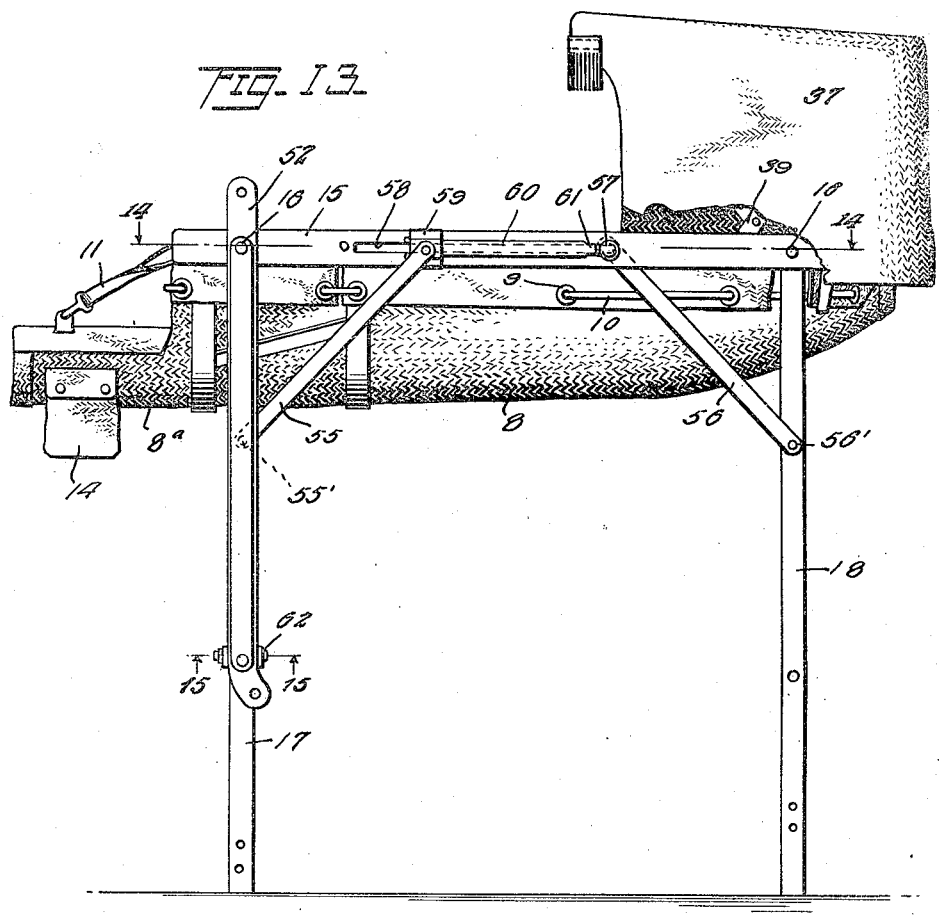
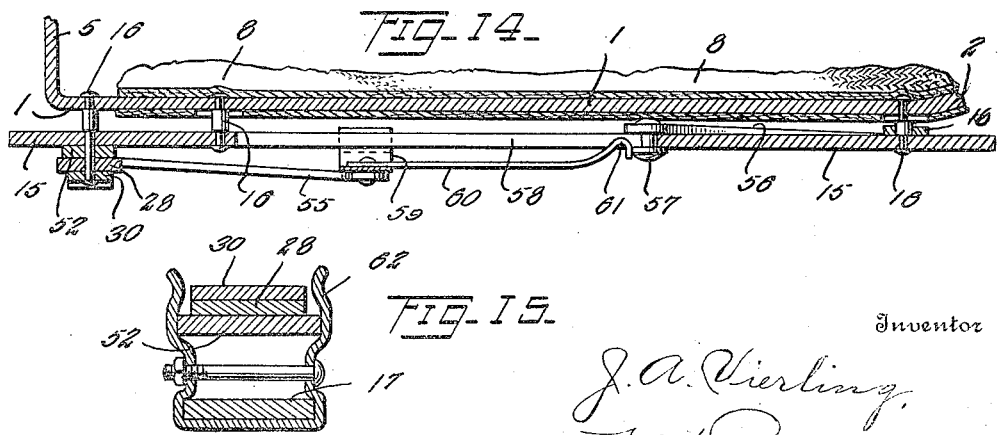
Inventor
J. A. Vierling
By J. K. Bryant
Attorney Patented July 3, 1923.

1,460,929

UNITED STATES PATENT OFFICE.

JACOB A. VIERLING, OF JERSEY CITY, NEW JERSEY.

COMBINED INFANT CRIB AND GOCART.

Application filed May 25, 1922. Serial No. 563,739.

*To all whom it may concern:*

Be it known that I, JACOB A. VIERLING, a citizen of the United States of America, residing at Jersey City, in the county of Hudson and State of New Jersey, have invented certain new and useful Improvements in Combined Infant Cribs and Gocarts, of which the following is a specification.

This invention relates to certain new and useful improvements in combined infant cribs and go-carts and embodies a structure adaptable for conversion from a rolling go-cart to a stationary crib.

One of the objects of the invention embodies in a combined infant crib and go-cart, the provision of a collapsible frame work having certain parts removable therefrom to permit the device to be folded into compact condition for storage or transporting the same.

Another object of the invention provides for a convertible infant crib or go-cart employing a plurality of brace members and catch devices for rigidly holding the structure in either go-cart or crib formation.

A still further object of the invention has reference to a brake device associated with the rear wheels of the structure when in go-cart formation for holding the wheels against movement with a locking device associated with the brake to hold the same in braking engagement with the wheel.

This invention is filed as a continuation in part, so far as shown and described in application filed by me on February 7, 1921, Serial No. 442,985, and embodies improvements thereover.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like designating characters refer to corresponding parts throughout the several views;

Figure 1 is a side elevational view of the device in go-cart formation with the fabric hood cover shown in section better to illustrate the brace bars and props of the hood, Figure 2 is a top plan view of the device in go-cart formation, Figure 3 is a side elevational view showing the structure collapsed and strapped for easy handling, Figure 4 is an end elevational view of the device in go-cart formation, Figure 5 is a detail sectional view taken on line 5—5 of Figure 4, showing a brake lever in engagement with one of the wheels, and the arm for holding the brake lever immovable, Figure 6 is a detail sectional view taken on line 6—6 of Figure 5 showing the locking arm for the brake lever, Figure 7 is a detail sectional view taken on line 7—7 of Figure 5 showing the brake construction, Figure 8 is a fragmentary detail sectional view of a side frame of the device showing the spring arm carried by a sliding clip on the frame bar, Figure 9 is a detail sectional view taken on line 9—9 of Figure 8, Figure 10 is a detail sectional view taken on line 10—10 of Figure 1 showing a portion of the frame bars of the hood structure, Figure 11 is a fragmentary perspective view of one of the bracing bars for the hood structure, Figure 12 is a fragmentary perspective view of one of the brace bars for the hood structure for retaining the same in a set-up position, Figure 13 is a side elevational view of the device in its crib formation, Figure 14 is a longitudinal sectional view taken on line 14—14 of Figure 13 showing the spring arm carried by a sliding clip upon a side rod of the frame engaging a brace bar for maintaining the structure in its crib formation, and Figure 15 is a detail sectional view taken on line 15—15 of Figure 13 showing a clamp for retaining certain ones of the frame bars when the device is in crib formation.

The present invention relating to a combined infant crib and go-cart provides a structure that is easily and readily convertible from one form of construction to the other, the device being especially adapted for use in connection with automobiles or for other vehicle travelling purposes, the device being set up in crib formation and presenting a substantially rigidly constructed crib upon the floor of an automobile or train, or any other place desired. The frame work embodies a plurality of braces and straps cooperating with each other when the device occupies either a crib or go-cart formation, ground wheels being removably secured to crossed side legs when the device is in go-cart or carriage formation.

Referring more in detail to the accompanying drawings, the invention will first be described in connection with its set-up position in crib formation, the body portion of the device being formed of side bars 1 shown more clearly in Figures 2 and 14, the head ends of the side bars 1 being curved as at 2 in directions toward each other and pivotally connected together as at 3, a locking pin 4 associated with the overlapping ends of the side bars retaining the same in spaced crib or go-cart formation. The opposite or foot ends of the side bars 1 are bent at right angles toward each other to provide overlapping arms 5 that are pivotally connected together as at 6 with a lock pin 7 associated with the overlapping ends of the arms 5 for maintaining the same in alignment as clearly shown in Figure 2.

A fabric mattress supporting sheet 8 is supported on the side bars 1 and the end extensions 2 and 5 thereof, the edges of the fabric sheet 8 being folded over the bars and having spaced eyelets 9 formed therein for the reception of a lacing cord 10 as clearly illustrated. The fabric sheet 8 includes a foot extension 8ª projecting outwardly of the arms 5 of the side bars 1 and is connected to said arms by adjustable straps 11. To prevent a child from sliding outwardly of the foot end of the device, a crotch piece 12 carried by the fabric sheet 8 as clearly shown in Figures 2 and 4 has a strap connection 13 with the cross arms 5. A pocket 14 is carried by the fabric sheet 8 adjacent the foot end thereof for the purpose of receiving removable fastening devices as screws and nuts when the device is transposed from a crib to a go-cart construction.

The supporting structure for the body frame includes a rod 15 secured to the outer side of each side bar 1 in spaced relation thereto by connecting bolts 16 as shown in Figures 2 and 14. Crossed legs 17 and 18 are pivotally mounted at their upper ends upon the bolts 16, the legs 17 and 18 having an intermediate cross brace 19 having the bent ends thereof as shown in Figure 4 aligned with the crossed portions of the legs 17 and 18 with removable thumb nuts and screws 20 connecting the same together.

Ground wheels are associated with the lower ends of the legs 17 and 18, each supporting wheel 21 shown more clearly in Figures 4, 5, and 7 is supported in a frame embodying side bars 22 and 23, the lower ends of the side bars rotatably supporting the wheel as shown in Figure 5 while the upper ends of the side bars as shown in Figure 7 are connected by a cross bolt 24, the upper end of the side bar 23 being angularly bent in a direction toward the side bar 22, and again bent at right angles to provide a portion extending parallel therewith as indicated at 25 with a clip 26 enclosing the upper end of the side bar 22 and portion 25. The lower ends of the legs 17 and 18 are received between the side bars 22 and the extension 25 of the side bar 23 as shown in Figure 7, the lower ends of the legs extending into the clip 26 while a thumb screw 27 passes through the side bars of the wheel supporting frame and adjacent legs above the clip 26 as shown in Figure 1.

Brace bars 28 and 29 are connected at their upper ends to the bolts 16 while a horizontal brace bar 30 extends between the lower ends of the brace bars 28 and 29, one end of the brace bar 30 being secured to the leg 17 and brace bar 29 by the thumb screw 27 while the other end of the brace bar 30 is pivotally connected as at 31 to the lower end of the brace bar 28 the brace bar 30 being secured by the thumb screw 27 to the leg as clearly shown in Figure 1.

A pair of brace bars 32 pivoted together at their overlapping ends as at 33, shown more clearly in Figure 4, are fixed at their outer ends to the side legs 18, while brace bars 34 pivotally connected as at 35 to the side frame bars 22 of the wheel structure are detachably connected at their adjacent ends by the set screw 36 to one of the brace bars 32, the brace bar 34 only being associated with the wheel supporting legs adjacent the foot end of the carriage or go-cart A hood 37 shown more clearly in Figure 1 is supported on a frame structure embodying inverted U-shaped side bows 38 and 39 pivotally mounted at their lower free ends upon the pin 40, the upper horizontal portions of the bows 38 and 39 being broken at the longitudinal axis of the body frame and hinged together as at 41, while braces 42 and 43 pivoted at their inner adjacent ends as at 44 are pivotally connected together as at 45 to the adjacent upper ends of the bows 38 and 39. To maintain the braces 42 and 43 in alignment, as shown in Figure 1, an arm 46 is pivotally connected at its lower end as at 47 to each side of the bow 39, the upper end of the arm being bifurcated and offset as shown in Figure 11 to provide spaced fingers 48 for enclosing the lower edge of the brace bar 43 as shown in Figure 10. The hood and its supporting frame is retained in the set-up position shown in Figure 1 by the arm 49 pivotally mounted at its upper end upon the pin 47 and having a side opening slot 50 adjacent the lower end thereof that receives the pin 51 carried by the adjacent end of the rod 15, shown more clearly in Figures 1 and 12. A pair of handle bars 52 is pivotally mounted adjacent their lower ends upon the bolts 16, the extending lower ends thereof being secured by the thumb screws 53 to the upper ends of the side legs 17, while a handle bar or grip 54 is removably secured between the outer ends of the handles 52, the handles extending in alignment with the legs 17 as shown in Figure 1.

The construction so far described refers to the device in its go-cart formation, the body part of the device being supported on the frame and rigidly braced by the several bars and braces specifically referred to. When the device is set up in go-cart formation, as above described, the same being supported upon the wheels 21, a brake device is associated with each of the wheels at the foot end of the go-cart and includes a lever 55 preferably of bent wire construction having a brake foot 56" for engagement with the tread of the wheel 21, the lever 55" being pivotally mounted upon the connecting bolt 24 between the side frames of the wheel structure with an upwardly directed angle end 57' to be operated by the foot. A locking arm 58' having a notch 59' in one end thereof is pivotally mounted as at 60' upon the upper bent end of the side frame 23 and is adapted to be moved upon its pivot 60' to cause the notch 59' to receive the upper end of the lever 55" for retaining the same in locked position with the foot 56" engaging the tread of the wheel 21 as clearly shown in Figures 5, 6 and 7. It will be understood that a rigidly constructed go-cart is provided, the go-cart being equipped with a hinged hood member and further adapted for receiving a mattress or pillow upon the fabric sheet 8.

The device being adapted for conversion into an infant crib structure, a pair of braced rods 55 and 56 are pivotally connected as at 55' and 56' to the crossed legs 17 and 18 respectively as shown in Figure 1, the upper end of the brace rod 56 carrying a laterally projecting pin 57 slidably mounted in the elongated slot 58 formed in the guide rail 15, shown more clearly in Figs. 8 and 14, while the upper end of the brace rod 55 is pivotally connected to a channel clip 59 that is slidably mounted upon the rail 15 as shown in Fig. 9. A relatively long spring arm 60 is carried by the sliding clip 59 and has the bent finger 61 at the free end thereof frictionally engaging the outer face of the rail 15.

In changing the device from the go-cart formation to that of a crib, the cross brace 19 as shown in Fig. 4 is disconnected from the side legs 17 and 18, the braces 34 disconnected from the cross braces 32 by removing the thumb screw 36 and the rail supporting frames disconnected from the lower ends of the legs 17 and 18 by removing the thumb screws 27. The thumb screws 53 are then removed from the side bars 52 of the handle, permitting the handle bars 52 to be swung downwardly to the position shown in Fig. 13 with the lower brace bar 28 positioned between the adjacent brace bar 30 and handle bar 52, the handle grip 54 being disconnected from the side bars 52 of the handle. The crossed legs 17 and 18 are then separated to assume perpendicular positions shown in Fig. 13 with the brace bars 28 and 30, and the handle bar 52 engaged by a clip 62 carried by the leg 17 as shown in Fig. 15, the brace bar 29 lying adjacent the supporting leg 18. During this movement, the pin 57 carried by the upper end of the brace bar 56 moves in the slot 58 of the side rail 13 while the clip 59 slides upon said side rails to position the spring finger 61 upon the end thereof into the rail slot 58 for engagement with the pin 57 upon the cooperating brace bar 56 as shown in Fig. 14 to hold the supporting legs 17 and 18 rigidly positioned and against relative movements with respect to the body frame.

When it is desired to fold the device for the purpose of conveniently carrying the same or for transportation purposes, as shown in Fig. 3, the several brace rods and handle bars are located relative to each other as shown in Fig. 13, and the supporting legs 17 and 18 are moved to cross each other to occupy positions parallel with the side bars 1 and side rails 15. The hood structure is collapsed by shifting the brace arm 46 upon its pivotal mounting 47 to occupy a position parallel to the lower end of the bow 39, the lower brace arm 49 being disconnected from the pin 61 and moved upwardly to occupy a position adjacent the upper end of the bow 39. The upper brace arms 42 and 43 are then broken upon their pivotal connection 44 to permit the bows 38 and 39 to move upon their pivotal connection 40 to occupy a position substantially alined with the body frame. When so positioned, the pivotal connection 33 between the cross braces 32, the pivotal connections 3 and 6 between the frame bars 1, and the hinge connections 41 between the upper end of the bows 38 and 39 are all alined, permitting pivotal movement of the connected parts to occupy the position shown in Fig. 3, straps 63 binding the folded frame together while a handle 64 associated with said straps facilitates easy handling thereof.

From the above detail description of the device, it is believed that the construction and operation thereof will be at once apparent, it being noted that the structure is easily and quickly convertible from a crib formation to that of a go-cart and may also be quickly folded into a compact condition for readily transporting the same. When in the folded condition shown in Fig. 3, the removable nuts and bolts etc. may be carried in the bag 14 while the wheels and brace bars removed therefrom may be placed within the fabric sheet 8.

While there is herein shown and described the preferred embodiment of the present invention, it is nevertheless to be understood that minor changes may be made therein without departing from the spirit and scope thereof as claimed.

What is claimed as new is:—

1. A combined infant crib and go-cart comprising a body frame, and supporting legs hinged to the body frame in crossed relation when in go-cart formation and arranged perpendicularly when set up as a crib, said body frame including side rods and brace bars connected to the legs and slidable on the rods.

2. A combined infant crib and go-cart comprising a body frame, supporting legs hinged to the body frame in crossed relation when in go-cart formation and arranged perpendicularly when set up as a crib, said body frame including side rods, each having an elongated slot therein, a brace bar pivotally connected to one of the legs and having a pin at its other end slidable in the rod slot, and a brace bar pivoted to the other leg and having a clip upon one end thereof slidable on the rod.

3. A combined infant crib and go-cart comprising a body frame, supporting legs hinged to the body frame in crossed relation when in go-cart formation and arranged perpendicularly when set up as a crib, said body frame including side rods, each having an elongated slot therein, a brace bar pivotally connected to one of the legs and having a pin at its other end slidable in the rod slot, a brace bar pivoted to the other leg and having a clip upon one end thereof slidable on the rod, and a spring finger carried by the clip adapted to position the free end thereof in the rod slot for engagement with the pin carried by the first named brace bar when the legs are perpendicularly positioned.

4. A combined infant crib and go-cart comprising a body frame, supporting legs hinged to the body frame in crossed relation when in go-cart formation and arranged perpendicularly when set up as a crib, said body frame including side rods, each having an elongated slot therein, a brace bar pivotally connected to one of the legs and having a pin at its other end slidable in the rod slot, a brace bar pivoted to the other leg and having a clip upon one end thereof slidable on the rod, a spring finger carried by the clip adapted to position the free end thereof in the rod slot for engagement with the pin carried by the first named brace bar when the legs are perpendicularly positioned, and pivotally connected arms rigidly carried by the lower ends of each pair of legs.

5. A combined infant crib and go-cart comprising a body frame, supporting legs hinged to the body frame in crossed relation when in go-cart formation and arranged perpendicularly when set up as a crib, said body frame including side rods, each having an elongated slot therein, a brace bar pivotally connected to one of the legs and having a pin at its other end slidable in the rod slot, a brace bar pivoted to the other leg and having a clip upon one end thereof slidable on the rod, a spring finger carried by the clip adapted to position the free end thereof in the rod slot for engagement with the pin carried by the first named brace bar when the legs are perpendicularly positioned, pivotally connected arms rigidly carried by the lower ends of each pair of legs, and additional brace bars connecting the body frame and legs when the latter are in crossed position.

6. A combined infant crib and go-cart comprising a body frame formed of hinged sections foldable upon the longitudinal axis, and a hood frame hingedly mounted on the body frame with the bow sections thereof foldable upon a longitudinal axis parallel with the folding of the frame.

7. A combined infant crib and go-cart comprising a body frame formed of hinged sections foldable upon the longitudinal axis, a hood frame hingedly mounted on the body frame with the bow sections thereof foldable upon a longitudinal axis parallel with the folding of the frame, and arms hinged to one of the bow frames and detachably connected to the body frame for holding the hood in a set-up position.

8. A combined infant crib and go-cart comprising a body frame, a rod secured to each side of the body frame in spaced relation thereto, supporting legs hinged to the side rods, a brace bar pivoted to each supporting leg and slidably connected at its other end to the side rod, and means carried by one sliding connection cooperating with the other connection for maintaining the legs in perpendicular positions.

9. In a device of the class described, a body frame having supporting legs, removable wheels for the legs, said wheels including frame bars with a wheel journaled therebetween, a cross-pin extending between the frame bars, a brake pivoted on the cross pin, and a locking lever for the brake pivotally mounted on the frame bars.

In testimony whereof I affix my signature.

JACOB A. VIERLING.